(12) United States Patent
Kashimba et al.

(10) Patent No.: US 10,154,145 B1
(45) Date of Patent: Dec. 11, 2018

(54) VIRTUAL TELEPHONY ASSISTANT

(71) Applicant: Republic Wireless, Inc., Raleigh, NC (US)

(72) Inventors: Jared Kashimba, Micanopy, FL (US); Sai Rathnam, Raleigh, NC (US); Justin Milam, Burgaw, NC (US); Jon Schniepp, Raleigh, NC (US); Sam Quaile, Durham, NC (US); Jesse Stimpson, Raleigh, NC (US); James Mulcahy, Raleigh, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 15/954,036

(22) Filed: Apr. 16, 2018

Related U.S. Application Data

(63) Continuation-in-part of application No. 15/802,699, filed on Nov. 3, 2017, now Pat. No. 9,986,079.

(51) Int. Cl.
| | |
|---|---|
| *H04M 1/00* | (2006.01) |
| *H04M 3/00* | (2006.01) |
| *H04M 1/64* | (2006.01) |
| *H04M 7/00* | (2006.01) |
| *G10L 15/26* | (2006.01) |

(Continued)

(52) U.S. Cl.
CPC ......... *H04M 7/0057* (2013.01); *G10L 15/265* (2013.01); *H04M 3/02* (2013.01); *H04M 3/42042* (2013.01); *H04M 3/42068* (2013.01)

(58) Field of Classification Search
CPC ... H04B 1/3833; H04L 12/2856; H04L 12/66; H04M 1/6075; H04M 1/64; H04M 2201/04; H04M 2201/60; H04M 3/42204; H04M 2203/355; H04M 2203/357; G06F 3/167; G06L 15/22; G06L 2015/223; G06Q 30/0241; H04N 7/157
USPC ............ 379/142.01, 142.04, 142.14, 142.15, 379/207.14, 207.15, 352, 353, 354, 88.03, 379/355.03, 355.06, 355.09, 357.04
See application file for complete search history.

(56) References Cited

U.S. PATENT DOCUMENTS

| | | | |
|---|---|---|---|
| 6,658,455 B1 * | 12/2003 | Weinman, Jr. ......... | G06Q 50/22 709/203 |
| 7,177,402 B2 * | 2/2007 | Metcalf ............... | H04L 12/2856 358/402 |

(Continued)

*Primary Examiner* — Binh Kien Tieu
(74) *Attorney, Agent, or Firm* — Gregory Stephens

(57) ABSTRACT

Examples are disclosed for placing an outbound telephony call using a smart speaker as a proxy device for a telephone account. A smart speaker may receive a verbal command to initiate the telephone call that includes identifying information for the called party. The verbal command may be forwarded to a smart speaker server where it may be converted to a computer instruction to initiate the telephone call. The computer instruction may then be forwarded to a communications server. The communications server may determine the telephone number to call based on the identifying information for the called party. The communications server may then establish a first communication link between itself and a telephony endpoint of the called party and a second communication link between itself and the smart speaker device. The communication links may then be bridged into a communications session between the smart speaker device and the telephony endpoint of the called party.

21 Claims, 13 Drawing Sheets

(51) Int. Cl.
*H04M 3/42* (2006.01)
*H04M 3/02* (2006.01)

(56) References Cited

U.S. PATENT DOCUMENTS

| | | | | |
|---|---|---|---|---|
| 7,242,966 | B1* | 7/2007 | Averkamp | H04B 1/3833 |
| | | | | 455/552.1 |
| 2002/0122541 | A1* | 9/2002 | Metcalf | H04L 12/2856 |
| | | | | 379/88.02 |
| 2005/0053201 | A1* | 3/2005 | Bhargava | H04M 3/4938 |
| | | | | 379/88.01 |
| 2010/0008356 | A1* | 1/2010 | Boni | H04L 29/06027 |
| | | | | 370/352 |
| 2010/0177876 | A1* | 7/2010 | Perrella | H04M 3/5183 |
| | | | | 379/88.04 |
| 2014/0058807 | A1* | 2/2014 | Altberg | H04L 12/66 |
| | | | | 705/14.4 |
| 2015/0088514 | A1* | 3/2015 | Typrin | G06F 3/167 |
| | | | | 704/249 |
| 2016/0044160 | A1* | 2/2016 | Redmann | H04M 3/42204 |
| | | | | 379/88.03 |

* cited by examiner

100

400

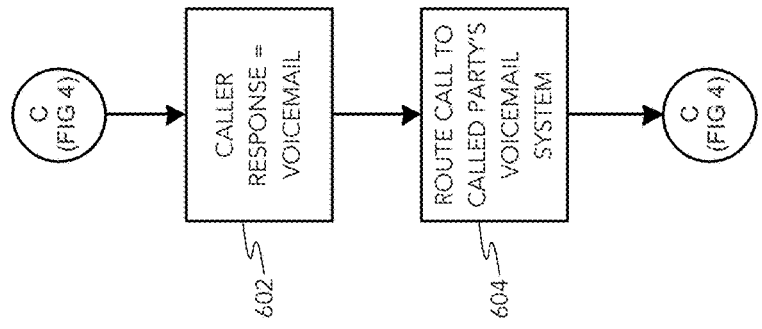
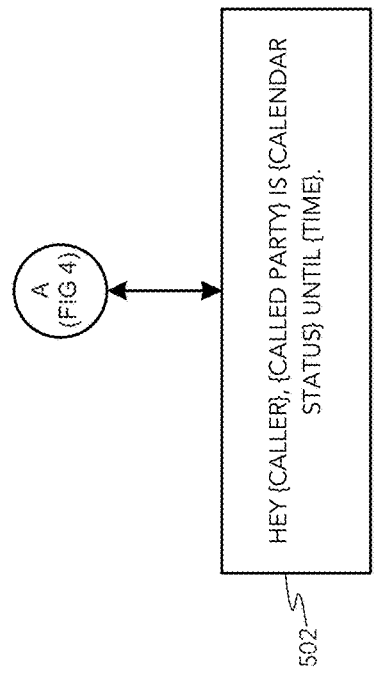

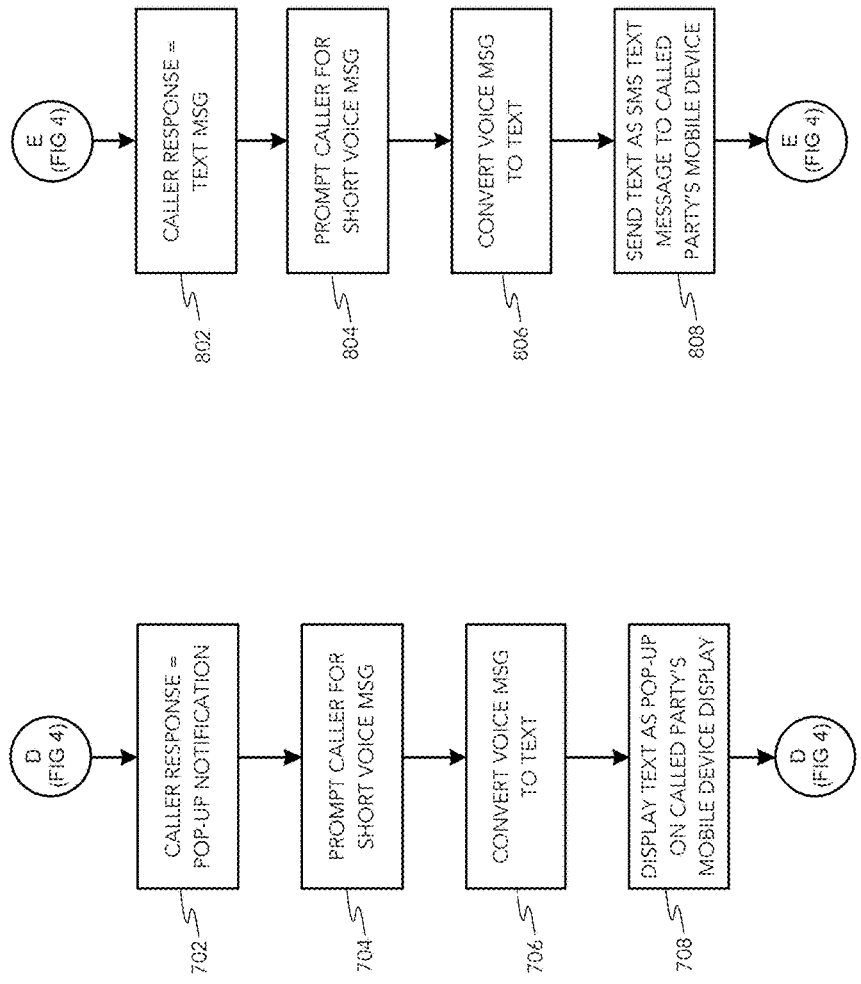

1500

900

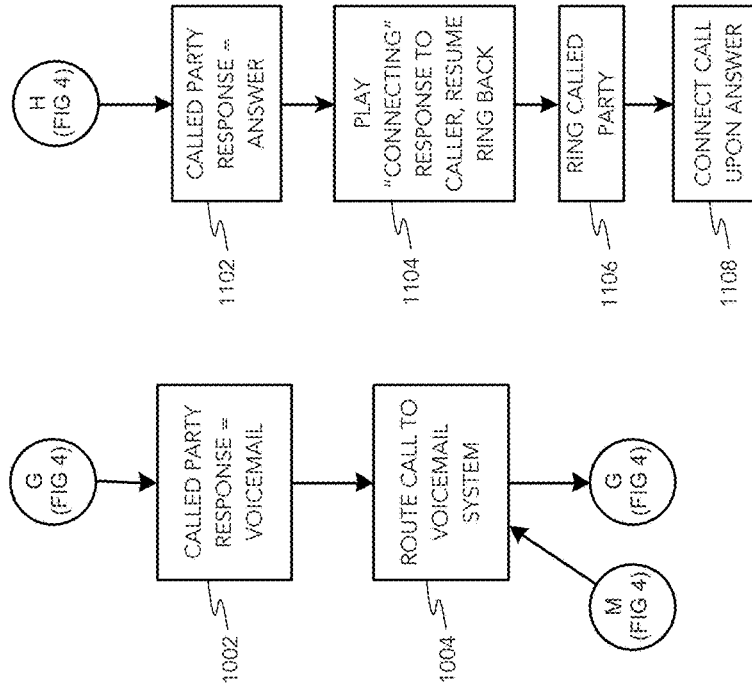
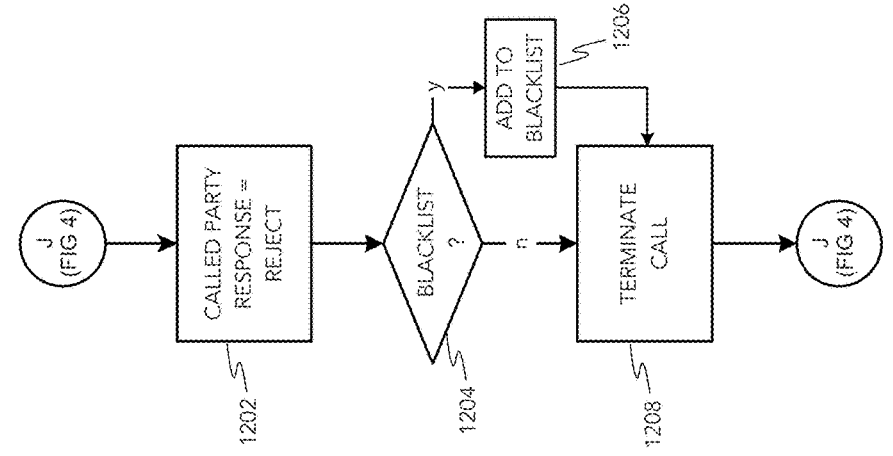
FIG. 12
1200
FIG. 11
1100
FIG. 10
1000

1400

1300

1600

1800

2000

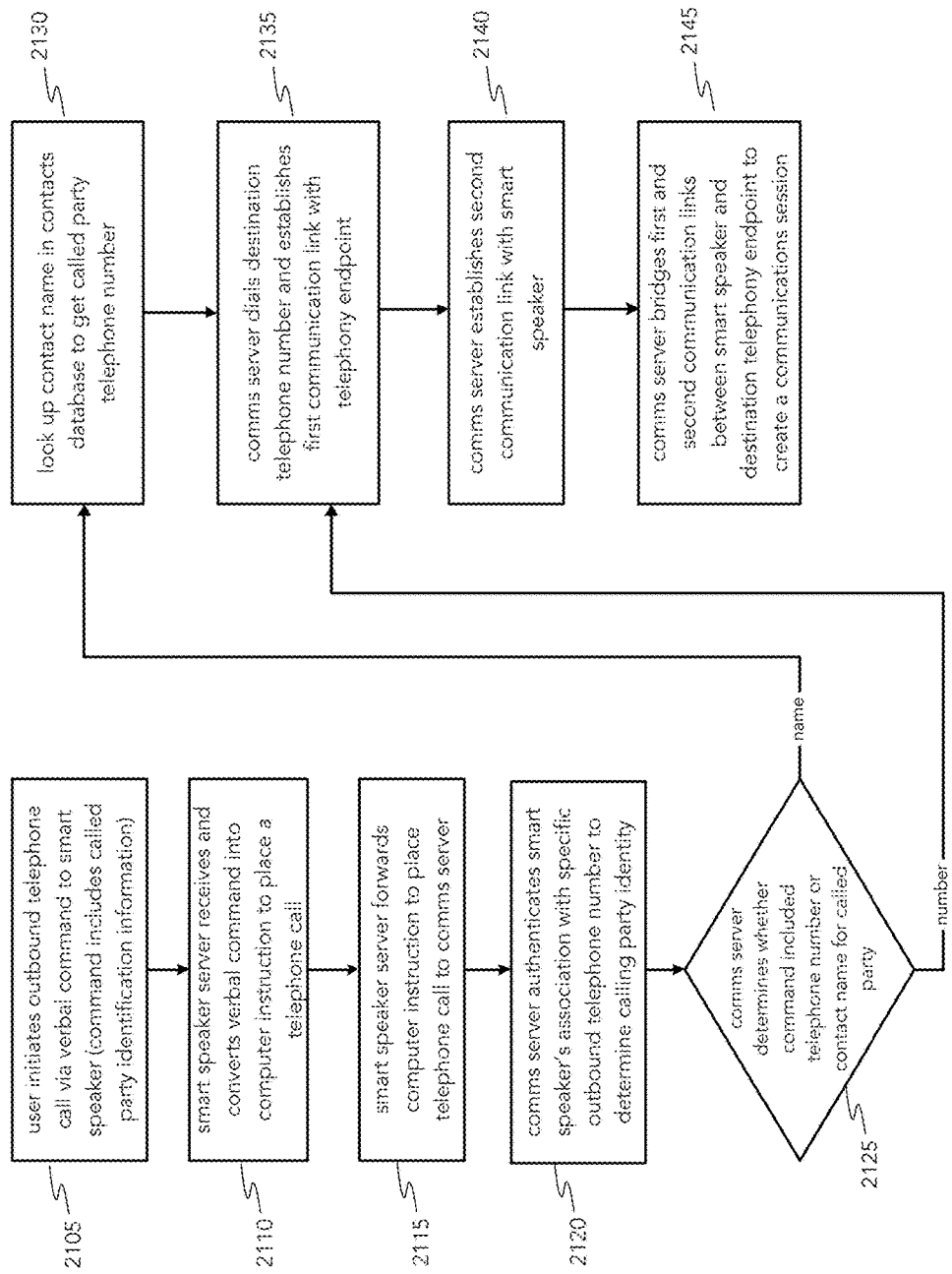

VIRTUAL TELEPHONY ASSISTANT

CROSS REFERENCE TO RELATED APPLICATIONS

This application is a continuation-in-part of and claims the priority filing benefit of U.S. application Ser. No. 15/802,699 filed Nov. 3, 2017, entitled "Virtual Telephony Assistant".

TECHNICAL FIELD

Examples described herein are generally related to techniques for providing a virtual telephony assistant.

BACKGROUND

Mobile telephony devices (often called smartphones) utilizing wireless communication protocols are ubiquitous. Many of these devices utilize one of the competing circuit switched cellular voice protocols (e.g., Global System for Mobile Communications (GSM) or Code Division Multiple Access (CDMA)) for telephony voice communications with other telephony endpoint devices. More recently, many of these mobile telephony devices may also utilize an Internet Protocol (IP) communication link rather than a circuit switched communication link to exchange voice data with a communications server using a Voice-over Internet Protocol (VoIP) system. The communications server mediates telephony calls between and among various endpoints. In addition, the mobile telephony device may also wirelessly connect to an IP network over one or more wireless IP interfaces and communication links.

The IP communication link may be 802.11 based such as WiFi or may be cellular based utilizing at least one of the many cellular IP air interfaces. There are several cellular IP air interfaces already in existence that use specific frequency ranges that are suitable for use with the embodiments described herein. It should be noted that the term 802.11 encompasses all of the 802.11 versions that currently exist and may be developed. Some cellular IP air interface examples include the General Packet Radio Service (GPRS), Enhanced Data for GSM Evolution (EDGE), Evolution-Data Optimized (EV-DO), High Speed Packet Access (HSPA), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), and High Rate Packet Data (HRPD). Moreover, there are many more wireless IP air interfaces in the planning and/or experimental stages (e.g., 5G, light-wave based, etc.) that use the same and/or different frequencies that would also be suitable for use with the embodiments described herein.

Some mobile telephony devices are capable of utilizing multiple different networks depending on network access or network conditions. For instance, the mobile telephony device may be able to communicate with a communications server that manages and mediates telephony calls, including the media stream itself, over either a circuit switched network or an IP based network. The communications server may be IP based but with interfaces to cellular circuit switched networks or the public switched telephone network (PSTN) as well as Voice-over Internet Protocol (VoIP) networks. If the communications server is IP based, it may include additional intelligence that allows it intervene in the call flow as well as access other IP data networks like the Internet in general to engage in IP data sessions. Moreover, the communications server may access other IP data networks while simultaneously managing a telephony call between or among a plurality of telephony endpoint devices. The mobile telephony device(s) are also able to access IP data networks such as the Internet over 802.11 WiFi and/or a cellular IP data connection.

In addition, a new category of home electronic device called the smart speaker is emerging. Some smart speakers may even be capable of VoIP telephony. The smart speaker may be provisioned with its own telephone number, may be linked to the account of one or more other telephony devices (e.g., mobile phones) that have their own telephone number, or both.

What is needed is a mechanism for accessing and leveraging the communication server's ability to intervene in the call flow and utilize IP data networks during a voice communication session.

BRIEF DESCRIPTION OF THE DRAWINGS

FIG. 5 illustrates another example of a logic flow diagram according to an embodiment of the invention.

FIG. 6 illustrates still another example of a logic flow diagram according to an embodiment of the invention.

FIG. 7 illustrates still another example of a logic flow diagram according to an embodiment of the invention.

FIG. 8 illustrates still another example of a logic flow diagram according to an embodiment of the invention.

FIG. 10 illustrates still another example of a logic flow diagram according to an embodiment of the invention.

FIG. 11 illustrates still another example of a logic flow diagram according to an embodiment of the invention.

FIG. 12 illustrates still another example of a logic flow diagram according to an embodiment of the invention.

FIG. 21 illustrates still another example of a logic flow diagram according to an embodiment of the invention.

DETAILED DESCRIPTION

Figure 1:
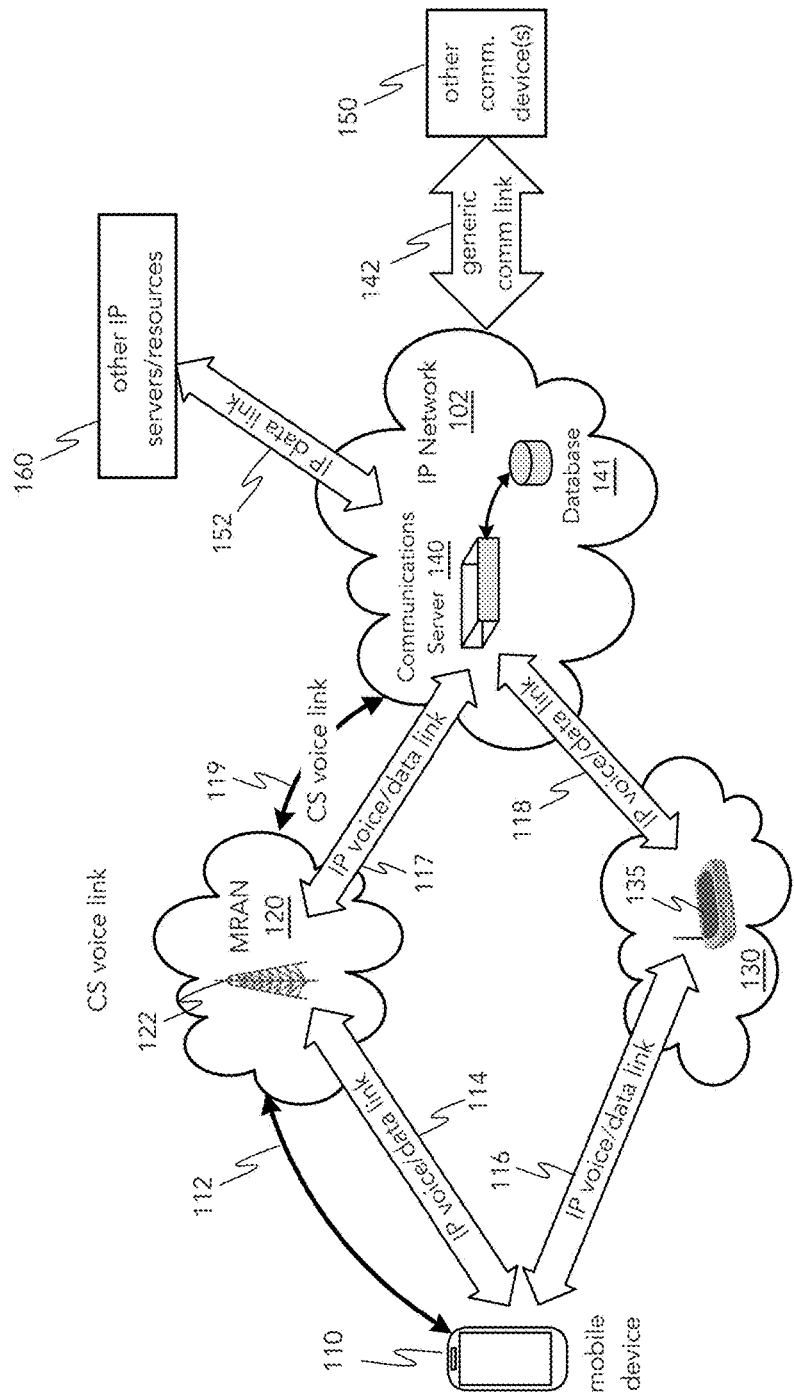
FIG. 1 illustrates an example block diagram for a networked environment.

The embodiments described herein disclose systems, methods, and computer program products for integrating a voice responsive telephony assistant into an existing telephony call. The embodiments may also describe systems, methods, and computer program products for integrating smart speakers into VoIP telephony systems. The systems and methods of the invention may be embodied in and performed by network based communications server(s) and other related components (e.g., databases), and software instructions executed by some or all of such devices and components, as will be explained in detail below. The different types of networks contemplated herein include, for example, circuit switched networks, IP based cellular mobile networks, and IP data networks, such as the Internet or other IP-based networks, including wide area networks, local area networks, and combinations thereof that include both wireless (e.g., 802.11) and wireline (e.g., Ethernet) means of access.

As used herein the term "telephony endpoint" is meant to generally indicate an end user physical device intended for, among other things, telephony calls to other telephony endpoints over one or more inter-connected telephony networks. Examples of telephony endpoints include a plain old telephone service (POTS) phones, VoIP telephones, mobile/cellular telephones, custom designed smart speakers, and software based soft-client applications executing on a computer device. Other examples may be understood to those of ordinary skill in the art.

As used herein the term "mobile telephony device" is meant to generally indicate a specific type of telephony endpoint, namely a mobile or cellular telephone such as a smartphone that may be equipped with multiple RF transceivers including an 802.11 WiFi transceiver, a cellular banded transceiver, and (optionally) a Bluetooth transceiver. Other similar RF transceivers configured to use various frequency ranges may also be implemented on the mobile telephony device as they are developed. A mobile telephony endpoint may further be messaging enabled meaning it includes the ability to send and receive text (SMS) or multi-media (MMS) messages using its telephone number as an address point. In addition, many mobile telephony devices may also include other installed messaging applications, such as, for instance, Facebook, WhatsApp, Instagram, Snapchat, and the like.

As used herein the term "smart speaker" is meant to generally indicate a specific type of telephony endpoint, namely an enhanced speaker device that may be equipped with multiple RF transceivers including an 802.11 WiFi transceiver, a cellular banded transceiver, and (optionally) a Bluetooth transceiver. Other similar RF transceivers configured to use various frequency ranges may also be implemented on the smart speaker as they are developed. A smart speaker endpoint may further be messaging enabled meaning it includes the ability to send and receive text (SMS) messages using its telephone number as an address point. Inbound text messages would first be converted to speech so as to be able to be played by the smart speaker. Out bound text messages are converted from speech to text before being delivered.

As used herein the term "telephony call" is meant to generally indicate any intended two-way exchange of voice data between two or more telephony endpoint devices.

As used herein the term "communications session" is meant to generally indicate any intended two-way exchange of voice data or other data between two or more computer or telephony endpoint devices.

As used herein, the term "communications server" is intended to mean an IP based computer that, among other capabilities, mediates and manages telephony calls and messages among telephony endpoints over one or more inter-connected telephony networks. In addition, the communications server may also include interactive voice response (IVR) technology that allows it to interact with users through the use of voice and/or DTMF tones input via a keypad. The IVR aspect may further include speech recognition functionality allowing the communications server to recognize keywords, commands, or instructions. Once recognized, any such commands or instructions may be carried out by the communications server or forwarded to another computer resource for execution.

As used herein, the term "communication link" is intended to mean a physical and/or logical channel that connects two or more telephony or computer endpoints with the IP based communications server. A communication link may be a signaling link, a media link, or both. In this context, a telephony call or communications session may be established via one or more communication links in which the IP based communications server is an endpoint for each of the communication links. The IP based communications server may then join one or more communication links together to establish a telephony call between or among two or more telephony endpoints. The IP based communications server may be hosted within an IP network accessible to the Internet.

In some instances, the communications server itself may be considered a telephony endpoint in cases where an end user is communicating with an artificial intelligence (AI) bot hosted within the communications server over a communication link as described above. The AI bot may further be 'present' in a telephony call between two or more endpoints existing as a virtual assistant of sorts. For instance, the AI bot may be given a name and made responsive to such name when spoken by one of the end users. When the AI bot recognizes the invocation of its name, it may be programmed to listen for commands or instructions from one or more of the end users.

References herein to a mobile telephony device or smart speaker capable of connecting to or communicating via a mobile radio access network (MRAN) refer to a mobile telephony device or smart speaker equipped with a cellular transceiver for wireless communication with basestations for purposes of accessing circuit switched voice services and/or mobile IP data services. Similarly, references herein to a mobile telephony device or smart speaker capable of connecting to or communicating via an IP data network refer to a mobile telephony device or smart speaker equipped with a transceiver for wireless communication (e.g., 802.11 WiFi) with a router or other IP data network access point.

Certain embodiments herein describe techniques for the IP based communications server to intervene in a call flow to intelligently route or otherwise respond to an inbound call.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 102, one or more IP based local area networks or wide area networks (LANs/WANs) 130 including an 802.11 wireless access point 135, and one or more MRANs 120 accessible via a cellular basestation tower 122.

It should be noted that alternative wireless IP based networks (not shown) that do not operate over the frequency spectrum typically associated with 802.11 (e.g., WiFi) or cellular may be implemented. One example of such an alternate wireless IP network may be WiMAX (e.g., 802.16).

Other examples may include, but are not limited to, networks utilizing television whitespace frequencies and other unlicensed (or yet to be licensed) frequencies, including, but not limited to, those under consideration for 5G implementations. These may include wireless networks operating within a frequency range of 100 MHz and 700 MHz, and wireless networks operating within a frequency range of 3.5 GHz and 3.7 GHz, and anything at or above 5 GHz including light-wave based transmission systems.

The MRANs 120 and the LANs 130 each have backhaul IP connectivity to the Internet 102 that provides connectivity with a communications server 140. The communications server 140 has many capabilities including: (i) an ability to manage and mediate telephony calls and messages between or among telephony endpoints, and (ii) an ability to manage and mediate IP data sessions between or among other IP enabled devices.

The MRAN 120 (sometimes referred to as a cellular network) may come in different varieties based on the circuit switched radio transmission protocol it supports. Two such circuit switched radio transmission schemes are the Global System for Mobile Communication (GSM) and Code Division Multiple Access (CDMA). These circuit switched radio transmission schemes are incompatible with one another necessitating an intervening interface to allow communication between mobile telephony devices 110 on either network. In addition, each network may operate over multiple specific frequency ranges. Often, there may even be an intervening network such as the Public Switched Telephone Network (PSTN) (not shown) between two distinct MRANs. Each MRAN 120 may include an interface to the PSTN (not shown) such that telephony calls crossing that interface can be handled by the receiving network whether it is an MRAN 120 or the PSTN.

The MRAN 120 may also provide mobile telephony devices 110 with wireless IP based data access to the Internet 102 using one of the aforementioned cellular IP protocols. Moreover, MRANs 120 may utilize IP protocols like Voice-over LTE (VoLTE) to enable telephony calling over an IP protocol rather than a circuit switched protocol. Similarly, an IP access point 135 may provide wireless connectivity for a mobile telephony device 110 to the Internet 102 via access point 135 using any of the 802.11 WiFi standards and/or any other type of IP based connectivity standard.

In certain embodiments, MRANs 120 include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards.

In normal operation, a mobile telephony device 110 may make and receive telephony calls. All calls are, at some point, routed through the communications server 140 residing in an IP network 102. Depending on location and current network conditions, the mobile telephony device 110 may communicate with the communications server 140 over (i) a WiFi IP voice/data link 116, 118 via an IP access point 135, (ii) a cellular IP voice/data link 114, 117 via a basestation 122 coupled to MRAN 120, or (iii) a circuit switched voice link 112, 119 via basestation 122 coupled to MRAN 120. Communications server 140 may also include a database 141 containing data on service subscribers it manages.

For telephony calls, the communications server 140 may also establish a secondary communication link 142 with another communication device 150 to establish the telephony call. The secondary communication link 142 is VoIP based with respect to the communications server 140 but may traverse other interconnected voice networks such as another MRAN, the PSTN, another VoIP network, or some combination thereof before terminating at the other communication device 150.

Figure 2:
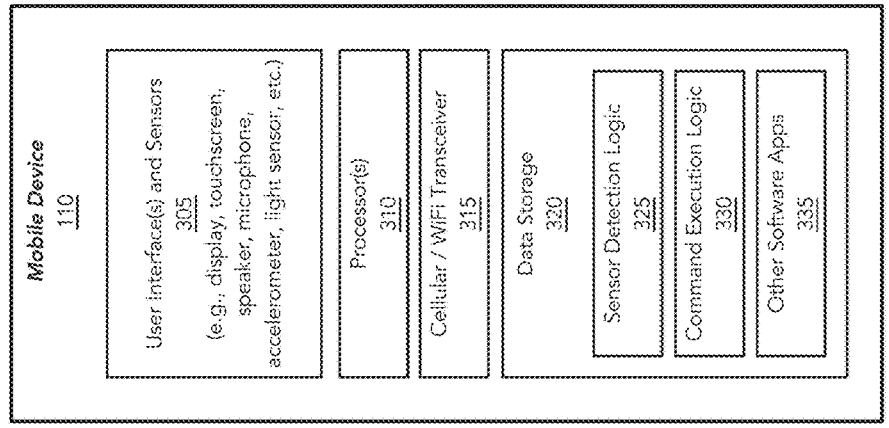
FIG. 2 illustrates a block diagram of a communications server according to an embodiment of the invention.

FIG. 2 illustrates a block diagram of a communications server 140 according to an embodiment of the invention. The communications server 140 may include one or more processors 205 coupled with a data storage component 210 comprised of a memory 215. The data storage component 210 may also include telephony assistant logic 220 and command execution logic 225. A VoIP communication interface 230 manages and mediates telephony calls while an IP data interface 235 manages IP data sessions with external devices or programs. The VoIP communication interface 230 operates in an IP mode. However, it is capable of communicating with non-IP telephony networks via other integrated or external network interfaces.

The telephony assistant logic 220 may be comprised of computer code that when executed monitors incoming data over the VoIP communication interface 230 and the IP data interface 235 during an existing call with another party. The telephony assistant logic 220 monitors for a trigger event. A trigger event may take many forms including pattern matching to an acoustic signature or recognition of a keyword or phrase. For instance, a set of taps to the housing of the mobile telephony device 110 may create a unique acoustic signature that may be detected and interpreted as a trigger event. One such unique acoustic signature may be the detection of three taps within a one second period in which the taps emit a sound within a particular frequency range.

The command execution logic 225 may be comprised of computer code that when executed recognizes the trigger event and causes the mobile telephony device 110 to enter a temporary command mode. Entering command mode initially places the mobile telephony device 110 into mute mode with respect to the ongoing telephony call with the other party. This may be performed locally on the communications server 140 or via an instruction sent to the mobile telephony device 110 from the communications server 140. Mute mode essentially blocks audio picked up from the mobile telephony device's microphone from being passed from the communications server 140 to the other communication device 150. Once mute mode is engaged, the mobile telephony device user may still speak into the device's microphone. The audio may still be digitized and sent to the communications server 140 over the telephony communication link for the existing telephony call. However, the communications server 140, being in command mode, treats the received audio differently. The communications server 140 parses the audio through the command execution logic 225 using natural language processing to recognize and interpret commands or instructions that may be carried out, or caused to be carried out, by the communications server 140.

Figure 3:
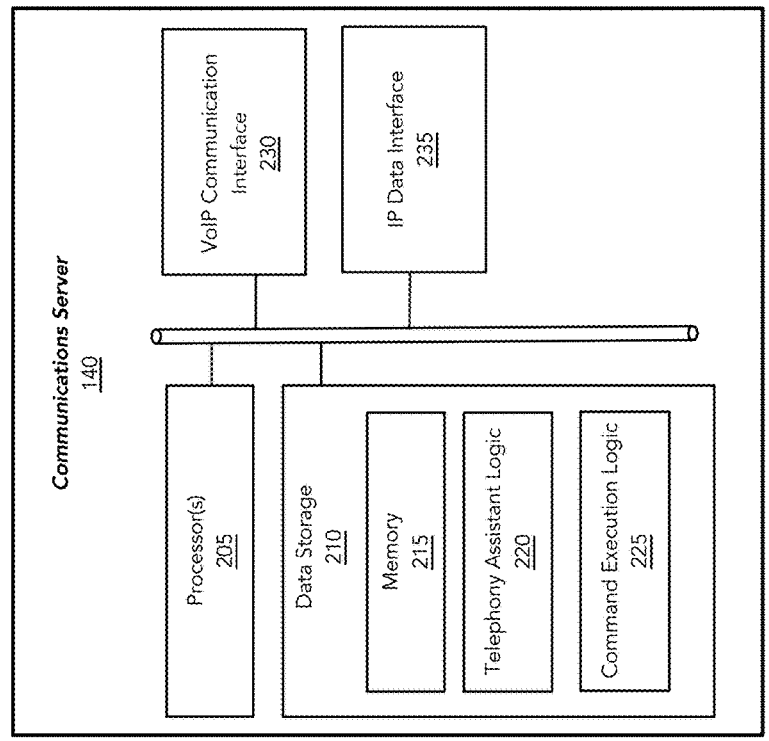
FIG. 3 illustrates a block diagram of an end user mobile telephony device according to an embodiment of the invention.

FIG. 3 illustrates a block diagram of an end user mobile telephony device 110 according to an embodiment of the invention. The mobile telephony device 110 may include a variety of user interface(s) and sensors 305 such as a touchscreen display, a speaker, a microphone, a global positioning system (GPS) chip, an accelerometer, a light sensor, etc. The mobile telephony device 110 may also include one or more processors 310 coupled with a data storage component 320 including sensor detection logic 325, command execution logic 330, as well as other software applications 335. The mobile telephony device 110 also comprises a cellular transceiver and a WiFi transceiver 315 for wireless communications with one or more wireless networks via wireless network access points (as shown in FIG. 1). The mobile telephony device 110 may include other wireless transceivers (not shown) like Bluetooth.

The sensor detection logic 325 may be comprised of computer code that when executed monitors incoming audio over the microphone for a trigger event. Just as above, a trigger event may take many forms including pattern matching to an acoustic signature or recognition of a keyword or phrase. The command execution logic 330 may be comprised of computer code that when executed recognizes the trigger event and causes the mobile telephony device 110 to enter a temporary command mode. Entering command mode initially places the mobile telephony device 110 into mute mode with respect to the ongoing telephony call with the other party. This may be performed locally by the mobile telephony device 110 itself. Mute mode essentially blocks audio picked up from the mobile telephony device's microphone from being passed to the other communication device 150. Once mute mode is engaged, the mobile telephony device user may still speak into the device's microphone. The command execution logic 330 parses the audio using natural language processing to recognize and interpret commands or instructions that may be carried out, or caused to be carried out, by the mobile telephony device 110.

FIGS. 4-15, 18-19, and 21 illustrate examples of logic flow diagrams according to embodiments of the invention. The logic flows may be representative of some or all of the operations executed by one or more embodiments described herein. Further, the logic flows may performed by circuitry and one or more components discussed herein. Moreover, logic flows may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur.

Figure 4:
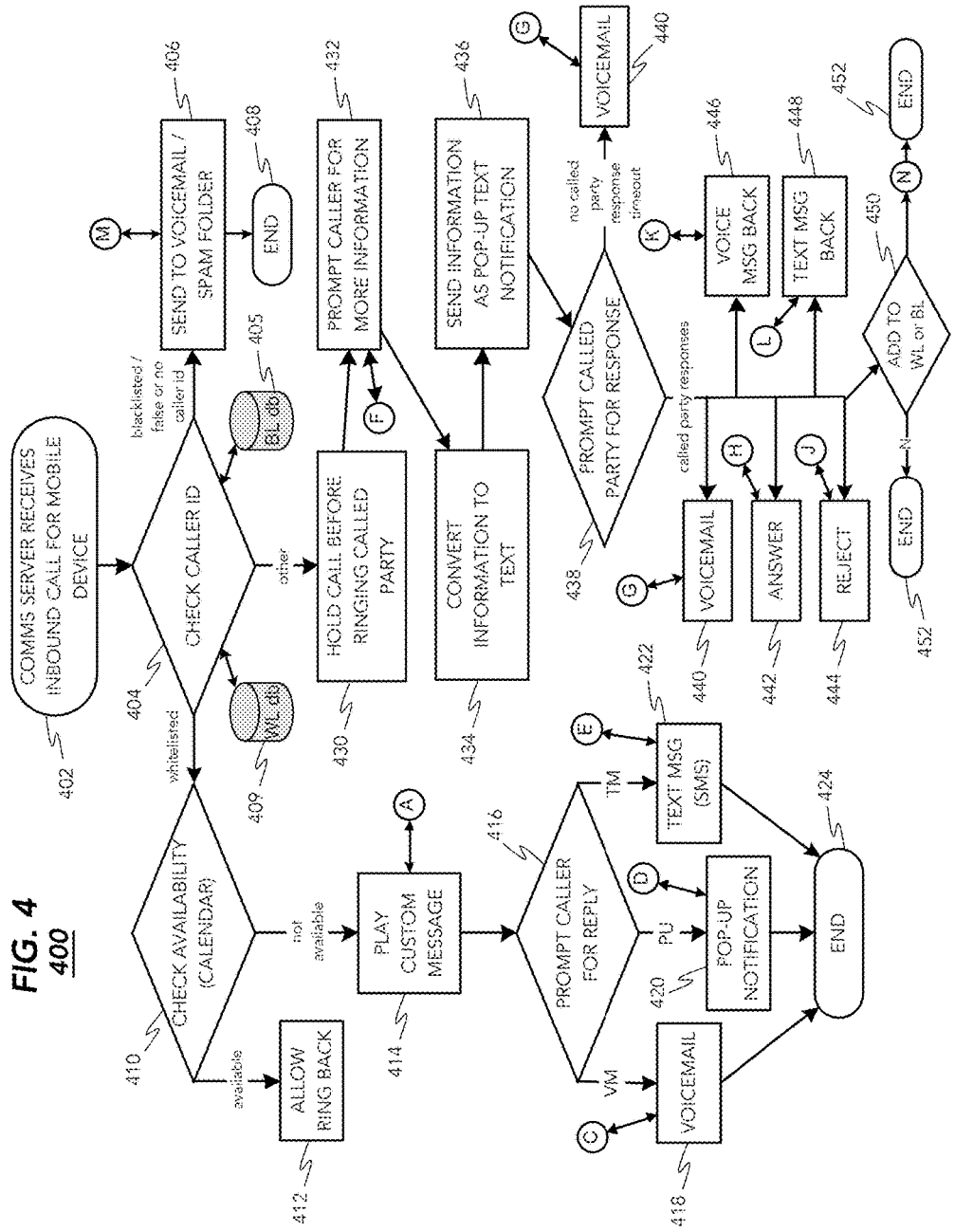
FIG. 4 illustrates an example logic flow diagram according to an embodiment of the invention.

FIG. 4 illustrates an example logic flow diagram 400 according to an embodiment of the invention. A communications server 140 receives an inbound telephony call from an external originating telephony endpoint 150 intended for mobile telephony device 110 of a called party at block 402. The communications server 140 may check a caller ID field included with the inbound call at decision block 404. Decision block 404 may reference a pair of databases to determine the identity of the caller.

There may be a blacklisted database 405 and a whitelisted database 409. The blacklisted database 405 may contain telephone numbers that have been flagged as undesirable to the user of mobile telephony device 110 and therefore should not be permitted to ring the mobile telephony device 110. The whitelisted database 409 may contain telephone numbers that have been flagged as desirable to the user of mobile telephony device 110 and therefore should be permitted to ring the mobile telephony device 110.

If the caller ID field comes back blacklisted from the blacklist database 405 lookup in decision block 404, then the communications server 140 may send the inbound call to a voicemail system or a spam folder at block 406. This process may be described in greater detail in FIG. 10.

If caller ID field comes back whitelisted from the whitelist database 409 lookup in decision block 404, then the communications server 140 may check the current availability of the called party via a shared calendar application with the mobile telephony device 110 at decision block 410. If the called party is available according to calendar information, then communications server 140 may pass the inbound call and ring the mobile telephony device 110. If the called party is not available according to calendar information, then communications server 140 may play a custom message to the caller. This process may be described in greater detail in FIG. 5.

After a custom message is played, the communications server 140 may prompt the caller for a reply at decision block 416. There may be three (3) options, for example, including voicemail, a pop-up notification, or a text message. If the caller response to decision block 416 is voicemail, then control is sent to block 418 where a voicemail system takes over as further described in FIG. 6. If the caller response to decision block 416 is pop-up notification, then control is sent to block 420 where a pop-up notification system takes over as further described in FIG. 7. If the caller response to decision block 416 is text message, then control is sent to block 422 where an SMS text message system takes over as further described in FIG. 8.

Figure 14:
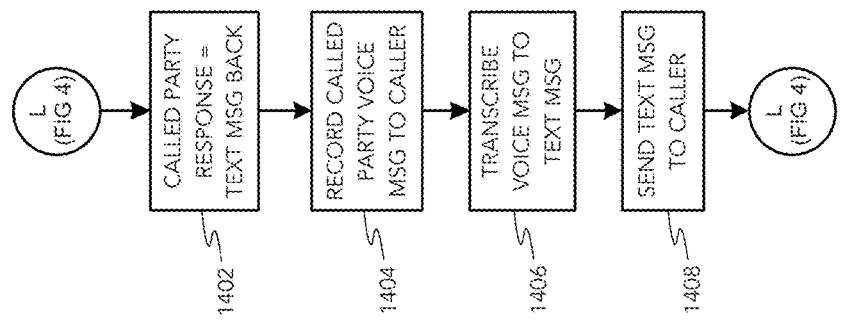
FIG. 14 illustrates still another example of a logic flow diagram according to an embodiment of the invention.

Returning to decision block 404, If the caller ID field is neither whitelisted nor blacklisted, the communications server 140 may hold the inbound call before ringing the called party at block 430. The communications server 140 may then answer the inbound call and prompt the caller for more information (e.g., name, purpose of call) at block 432. The communications server 140 may then optionally subject the caller to a challenge type test to determine if the caller is a human or a machine. This challenge test process may be further described in FIG. 9. The communications server 140 may then convert whatever response the caller made as a result of block 432 into text at block 434. The communications server 140 may then package the converted text into a pop-up notification that is sent to and displayed on the mobile telephony device 110 at block 436. The communications server 140 may then prompt the called party's mobile telephony device 110 for a response at decision block 438. Examples of called party responses may include: send to voicemail (FIG. 10), answer the call (FIG. 11), reject call (FIG. 12), send voice message back (FIG. 13), or send text message back (FIG. 14).

FIG. 5 illustrates another example of a logic flow diagram 500 according to an embodiment of the invention. This logic flow diagram 500 may describe what a custom message from block 414 would be. In this example, the custom message that is played to the whitelisted caller may say "Hey 'caller', 'called party' is 'calendar status' until 'time', where the fields for 'caller', 'called party', 'calendar status', and 'time' may be populated by referencing one or more databases available to the communications server 140. For instance, the name of the caller may be pulled from the whitelisted database of contacts that match the caller ID for the incoming call. The called party is the person associated with mobile telephony device 110 being called. The name to use for the custom message, however, may be suited to fit the relationship between the caller and the called party. For instance, if the caller is the son of the called party, the name of the called party for the custom message may be set to 'dad'. The calendar status of the called party may be pulled from a calendar application linked to the user of the mobile telephony device 110. The calendar status may provide a reason why the called party is currently unavailable such as, for instance, in a meeting. The time field for the custom message may refer to the time at which the meeting expires. Putting all the information together may yield a custom message that reads as follows: "Hey Casey, dad is in a meeting until 3:15. Would you like to leave a voicemail, a pop-up, or a text message?" Upon a response (or a timeout) from the caller, control is returned to FIG. 4. The foregoing example is merely illustrative. The exact content of the custom message may be altered without changing the scope of the invention.

FIG. 6 illustrates still another example of a logic flow diagram 600 according to an embodiment of the invention. In this logic flow diagram 600, the caller has responded to decision block 426 of FIG. 4 with a reply to the custom message of the called party indicating voicemail at block 602. The communications server 140 may then route the inbound call to the called party's voice mail system in block 604 before returning control of the overall process back to FIG. 4.

FIG. 7 illustrates still another example of a logic flow diagram 700 according to an embodiment of the invention. In this logic flow diagram 700, the caller has responded to decision block 426 of FIG. 4 with a reply to the custom message of the called party indicating pop-up notification at block 702. The communications server 140 may then prompt the caller to speak a short voice message in block 704. The communications server 140 may then convert the voice message to text in block 706. The communications server 140 may then cause the text corresponding to the voice message to be sent to and displayed on the mobile telephony device 110 as a pop-up notification at block 708 before returning control of the overall process back to FIG. 4.

FIG. 8 illustrates still another example of a logic flow diagram 800 according to an embodiment of the invention. In this logic flow diagram 800, the caller has responded to decision block 426 of FIG. 4 with a reply to the custom message of the called party indicating text message notification at block 802. The communications server 140 may then prompt the caller to speak a short voice message in block 804. The communications server 140 may then convert the voice message to text in block 806. The communications server 140 may then cause the text corresponding to the voice message to be sent to the mobile telephony device 110 as an SMS text message at block 808 before returning control of the overall process back to FIG. 4.

Figure 9:
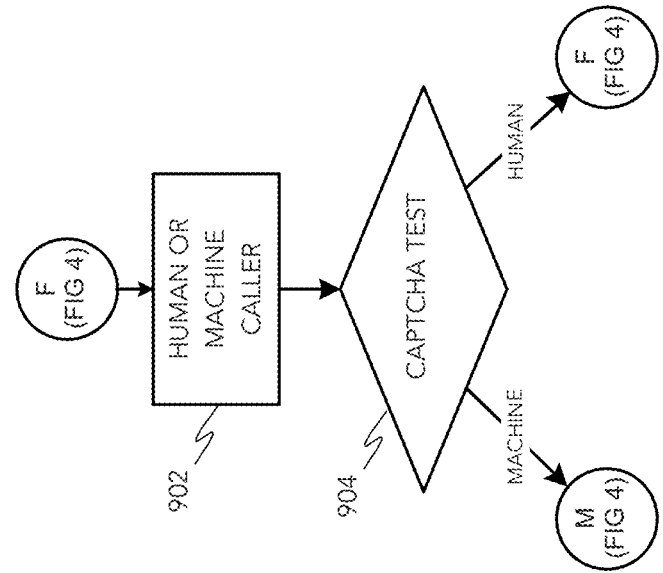
FIG. 9 illustrates still another example of a logic flow diagram according to an embodiment of the invention.

FIG. 9 illustrates still another example of a logic flow diagram 900 according to an embodiment of the invention. In this logic flow diagram 900, the caller has responded to block 432 of FIG. 4 with additional information that may be subjected to a challenge test to determine if the caller is a human or a machine (e.g., recording) at block 902. The challenge test may be administered in decision block 904 and may involve choosing from any number of tasks that a human can understand and perform but a recording cannot. For example, a simple instruction to press any key could be performed by a human but not a recording. Upon detecting a key press, the communications server 140 may interpret the response as coming from a human caller and return control of the process to the point it was in FIG. 4 just prior to the challenge test. Conversely, if the caller fails the challenge test, control may be returned to s different point in the process of FIG. 4. In this case, the inbound call will be immediately routed to a voicemail system or a spam folder of the called party.

FIG. 10 illustrates still another example of a logic flow diagram 1000 according to an embodiment of the invention. In this logic flow diagram 1000, the called party has responded to decision block 438 of FIG. 4 with a selection of voicemail or a timeout due to no called party response at block 1002. The communications server 140 may then route the inbound call to the called party's voice mail system in block 1004 before returning control of the overall process back to FIG. 4.

FIG. 11 illustrates still another example of a logic flow diagram 1100 according to an embodiment of the invention. In this logic flow diagram 1100, the called party has responded to decision block 438 of FIG. 4 with a selection to answer the inbound call at block 1102. The communications server 140 may then pay a "connecting" response to the caller and/or resume the ringing function to indicate to the caller that the call is being placed at block 1104. The communications server 140 may then ring the called party at block 1106 and upon connecting the call at block 1108, return control of the overall process back to FIG. 4.

FIG. 12 illustrates still another example of a logic flow diagram 1200 according to an embodiment of the invention. In this logic flow diagram 1200, the called party has responded to decision block 438 of FIG. 4 with a selection to reject the inbound call at block 1202. The communications server 140 may then query the called party whether to add the caller to the blacklist database at decision block 1204. If the called party response is determined to be yes, the communications server 140 may then add the telephone number of the caller to the blacklist database in block 1206 before terminating the call at block 1208 and returning control of the overall process back to FIG. 4.

Figure 13:
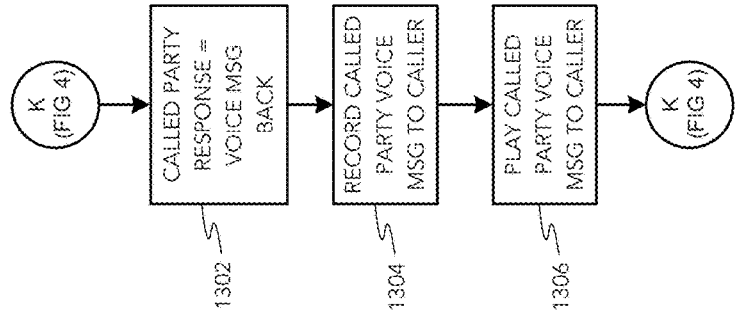
FIG. 13 illustrates still another example of a logic flow diagram according to an embodiment of the invention.

FIG. 13 illustrates still another example of a logic flow diagram 1300 according to an embodiment of the invention. In this logic flow diagram 1300, the called party has responded to decision block 438 of FIG. 4 with a selection to send a voice message back to the caller at block 1302. The communications server 140 may then prompt the called party to record a short voice message at block 1304. The communications server 140 may then play the called party's voice message back to the caller at block 1306 before returning control of the overall process back to FIG. 4.

FIG. 14 illustrates still another example of a logic flow diagram 1400 according to an embodiment of the invention. In this logic flow diagram 1400, the called party has responded to decision block 438 of FIG. 4 with a selection to send a text message back to the caller at block 1402. The communications server 140 may then prompt the called party to record a short voice message at block 1404. The communications server 140 may then convert or transcribe the voice message to a text message at block 1406. The communications server 140 may then send the SMS text message back to the caller at block 1408 before returning control of the overall process back to FIG. 4.

Figure 15:
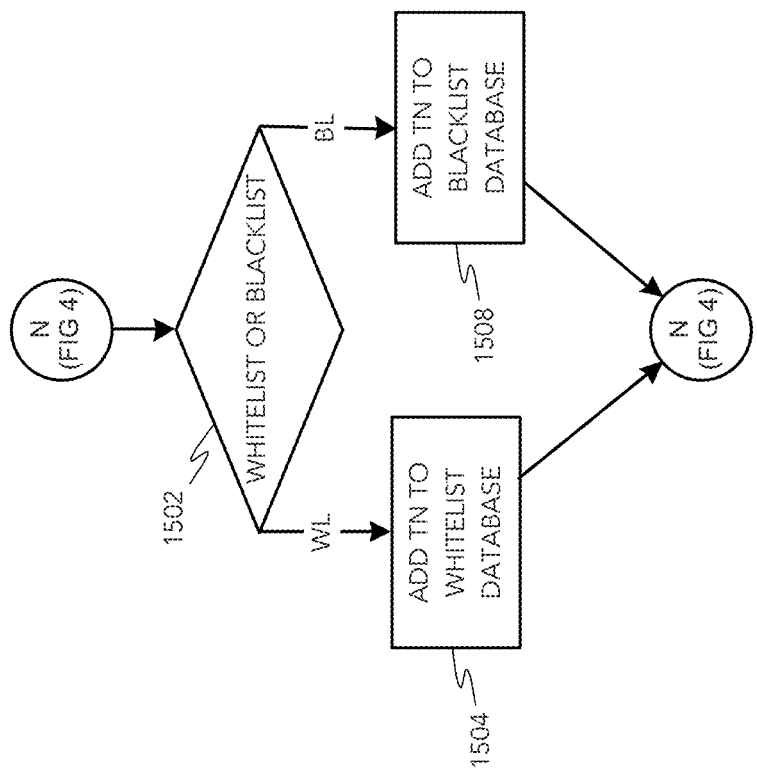
FIG. 15 illustrates still another example of a logic flow diagram according to an embodiment of the invention.

FIG. 15 illustrates still another example of a logic flow diagram 1500 according to an embodiment of the invention. In this logic flow diagram 1500, the called party has been prompted to respond to a decision block 438 of FIG. 4 with a decision to add the caller to either the whitelist database or blacklist database at block 1502. In response to the called party's response to add the caller to the whitelist database, the communications server 140 may then add caller's telephone number (TN) to whitelist database at block 1504 before returning control of the overall process back to FIG. 4. In response to the called party's response to add the caller to the blacklist database, the communications server 140 may then add caller's telephone number (TN) to blacklist database at block 1508 before returning control of the overall process back to FIG. 4.

Figure 16:
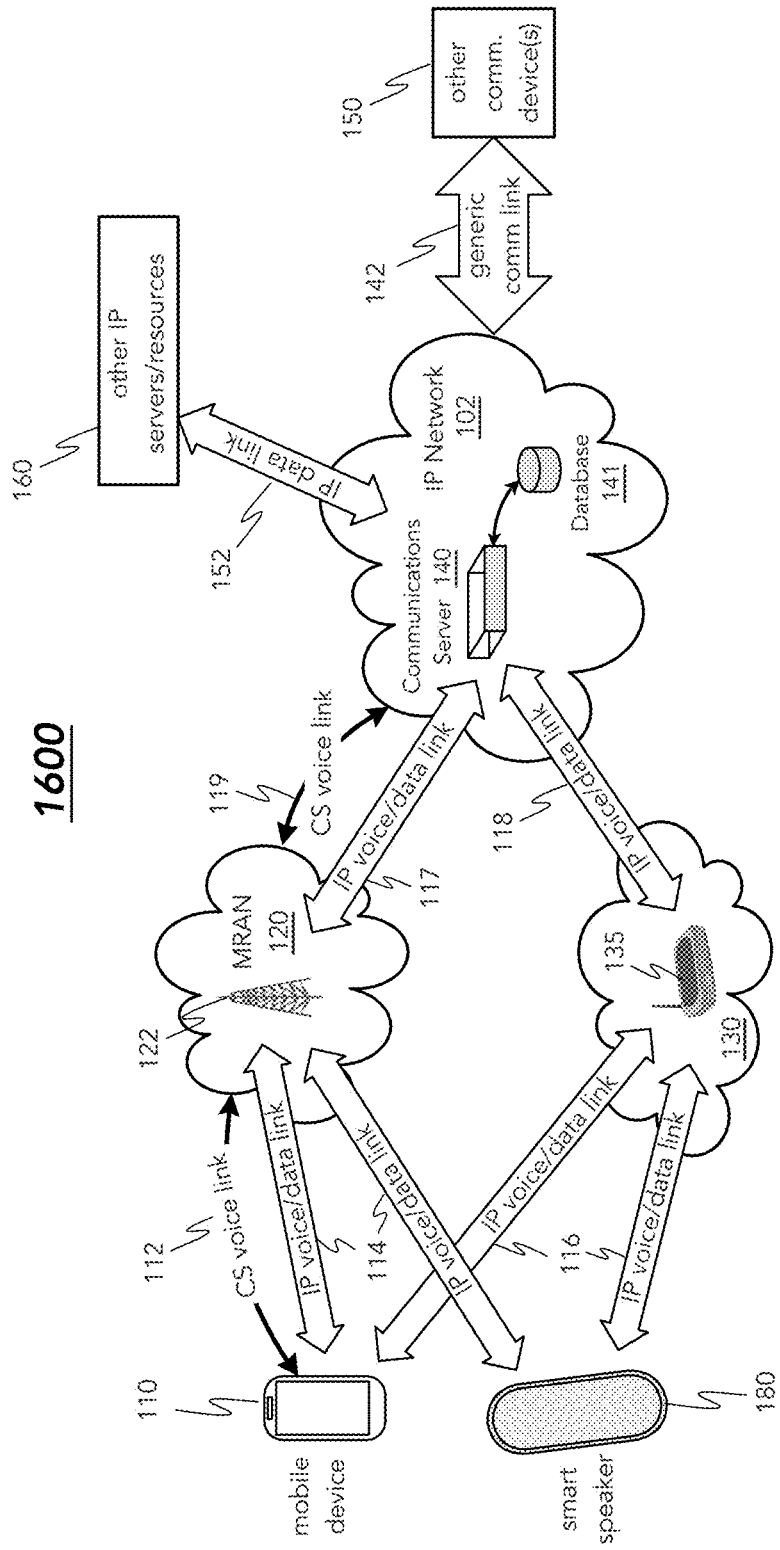
FIG. 16 illustrates another example block diagram for a networked environment.

FIG. 16 illustrates an exemplary networked environment 1600 for implementing certain exemplary embodiments described herein. The networked environment 1600 is similar to that of FIG. 1 but may further include an associated smart speaker 180 that is also capable of VoIP communications and general IP data communications with communications server 140 via radio tower 122 and MRAN 120 or IP access point 135 over IP access network 130.

Figure 17:
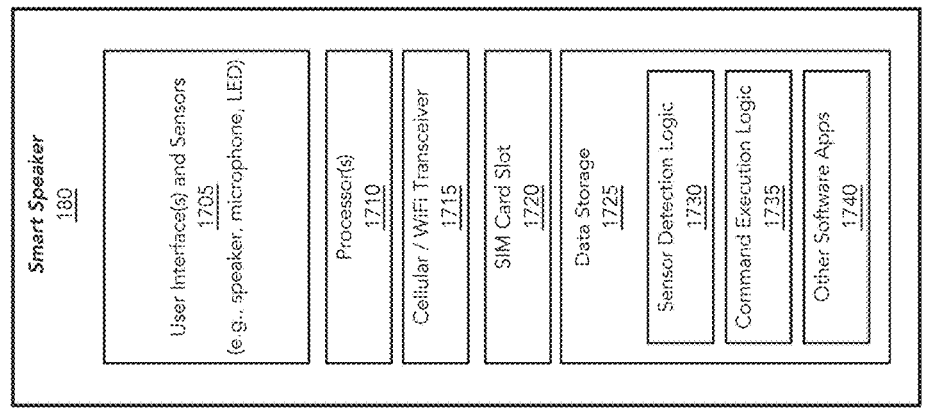
FIG. 17 illustrates a block diagram of smart speaker according to an embodiment of the invention.

FIG. 17 illustrates a block diagram of a smart speaker device 180 according to an embodiment of the invention. The smart speaker device 180 may include a variety of user interface(s) and sensors 1705 such as one or more speakers, one or more microphones, a global positioning system (GPS) chip, etc. The smart speaker device 180 may also include one or more processors 1710 coupled with a data storage component 1725 including sensor detection logic 1730, command execution logic 1735, as well as other software applications 1740. The smart speaker device 180 may also comprise a cellular transceiver and a WiFi transceiver 1715 for wireless communications with one or more wireless networks via wireless network access points (as shown in FIG. 1). The smart speaker device 180 may further include other wireless transceivers (not shown) like Bluetooth. Also included may be at least one SIM card slots 1720 adapted to receive and operate a SIM card from one or more mobile network service providers to provide access to one or more MRANs 120 as shown in FIG. 16.

Figure 18:
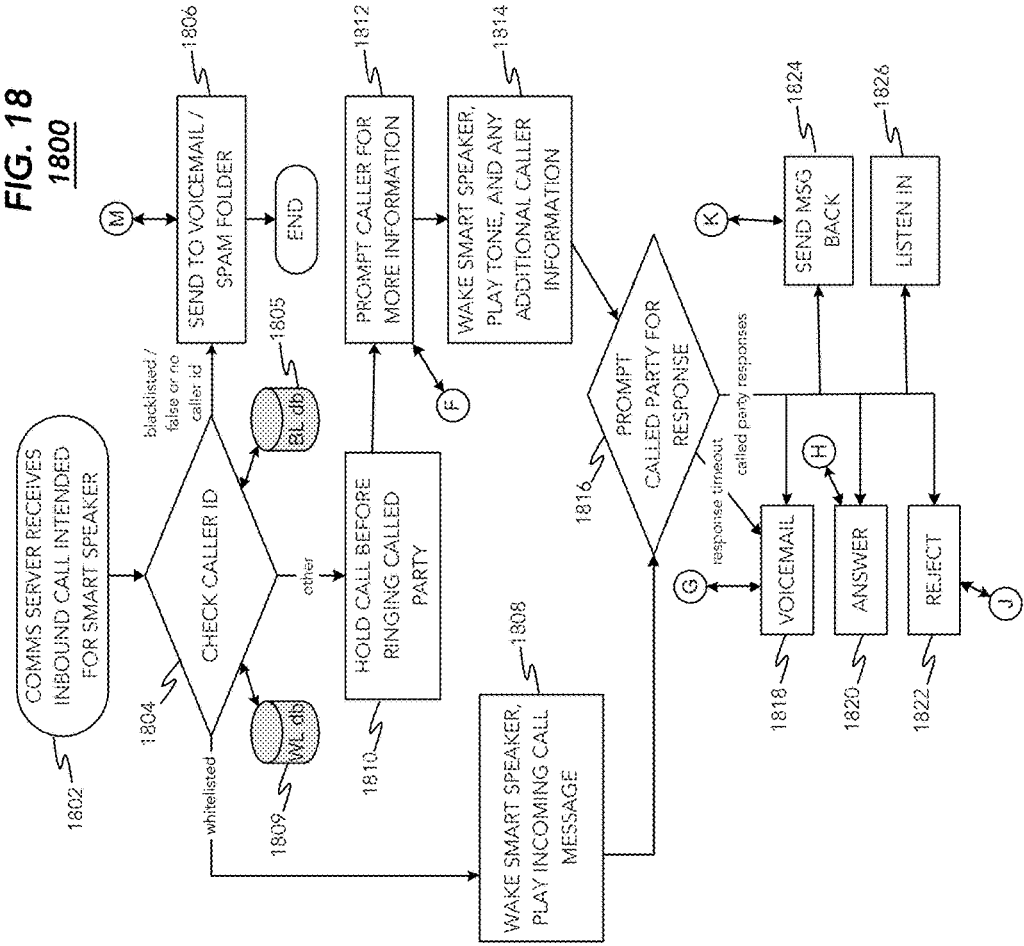
FIG. 18 illustrates still another example of a logic flow diagram according to an embodiment of the invention.

FIG. 18 illustrates an example logic flow diagram 1800 according to an embodiment of the invention. In this logic flow diagram 1800, the communications server 140 receives an inbound call intended for smart speaker 180. The smart speaker may be telephony enabled using Voice-over Internet Protocol (VoIP) telephony protocols to make and receive calls. The smart speaker may also be associated with its own telephone number and/or be associated with one or more telephony devices known to the communications server 140. The communications server 140 may then check a caller ID field included with the inbound call at decision block 1804. Decision block 1804 may reference a pair of databases to determine the identity of the caller.

There may be a blacklisted database 1805 and a whitelisted database 1809. The blacklisted database 1805 may contain telephone numbers that have been flagged as undesirable to the user(s) of smart speaker 180 and therefore should not be permitted to ring the smart speaker 180. The whitelisted database 1809 may contain telephone numbers that have been flagged as desirable to the user of smart speaker 180 and therefore should be permitted to ring the smart speaker 180.

If the caller ID field comes back blacklisted from the blacklist database 1805 lookup in decision block 1804, then the communications server 140 may send the inbound call to a voicemail system or a spam folder at block 1806. This process may be described in greater detail in FIG. 10.

If caller ID field comes back whitelisted from the whitelist database 1809 lookup in decision block 1804, the communications server 140 may then send a signal to wake up the smart speaker 180 and play an incoming call message at block 1808. The incoming call message may be, for instance, something like, "Your son Shane is calling. What would you like to do?" The communications server 140 may then prompt the smart speaker 180 for a response at decision block 1816. Examples of responses from a user to the smart speaker 180 may include: send to voicemail (FIG. 10), answer the call (FIG. 11), reject call (FIG. 12), send voice message back (FIG. 13), or open a channel to listen in to the caller at block 1826.

Returning to decision block 1804, If the caller ID field is neither whitelisted nor blacklisted, the communications server 140 may hold the inbound call before ringing the called party at block 1810. The communications server 140 may then answer the inbound call and prompt the caller for more information (e.g., name, purpose of call) at block 1812. The communications server 140 may then send a signal to wake up the smart speaker 180 and play whatever response the caller made as a result of block 1812 along with any caller ID information at block 1814. The communications server 140 may then send control over to decision block 1816 to prompt the called party for a response as described above.

Figure 19:
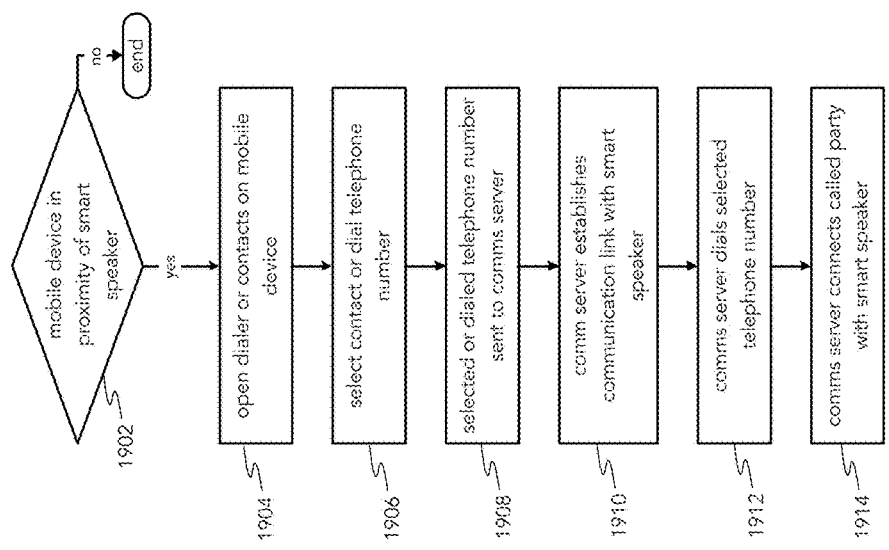
FIG. 19 illustrates still another example of a logic flow diagram according to an embodiment of the invention.

FIG. 19 illustrates another example of a logic flow diagram 1900 according to an embodiment of the invention. In this embodiment, a user's mobile device 110 may be used as a secondary interface to the smart speaker 180 to place telephony calls. Because the smart speaker does not necessarily include a video display or touch screen capability, it can only be used directly via voice recognition and commands. However, a user may have multiple devices linked together in an account accessible to the communications server 140. In such cases, the communications server can accept input or commands from one device and apply the commands to another associated device.

In this logic flow diagram 1900, the user may wish to place an outbound telephony call from thee smart speaker device 180 using the mobile telephony device 110 as the interface to "dial". The communications server 140 may first determine if the mobile telephony device 140 is in close proximity to the smart speaker 180 at decision block 1902. This may be determined in a variety of ways including a GPS geolocation comparison of both devices. Another method may be to have the communications server determine if both devices are currently connected to the same IP access point 135. If the mobile telephony device 110 and the smart speaker 180 are not in proximity of one another, the communications server 140 may not permit the mobile telephony device 110 to place a call on behalf of the smart speaker 180. If the mobile telephony device 110 and the smart speaker 180 are in proximity of one another, the communications server 140 may permit the mobile telephony device 110 to place a call on behalf of the smart speaker 180. The user may then open the dialer or a contacts database on the mobile telephony device 110 at block 1904 and select a contact or dial a telephone number at block 1906. The selected or dialed telephone number may then be sent to and received by the communications server 140 along with in indication that the communications server should connect the call to the smart speaker device at block 1908. The indication may be an option presented to the user by the mobile telephony device 110. The indication may also be a spoken command to the mobile telephony device 110 when in a voice dialing mode. The communications server 140 may then establish a telephony communication link with the smart speaker 180 at block 1910. The communications server 140 may then dial the selected contact or telephone number at block 1912. Once the called party answers the telephony call, the communications server 140 may then connect the called party to the smart speaker 180 at block 1914 to create a telephony communication session.

Figure 20:
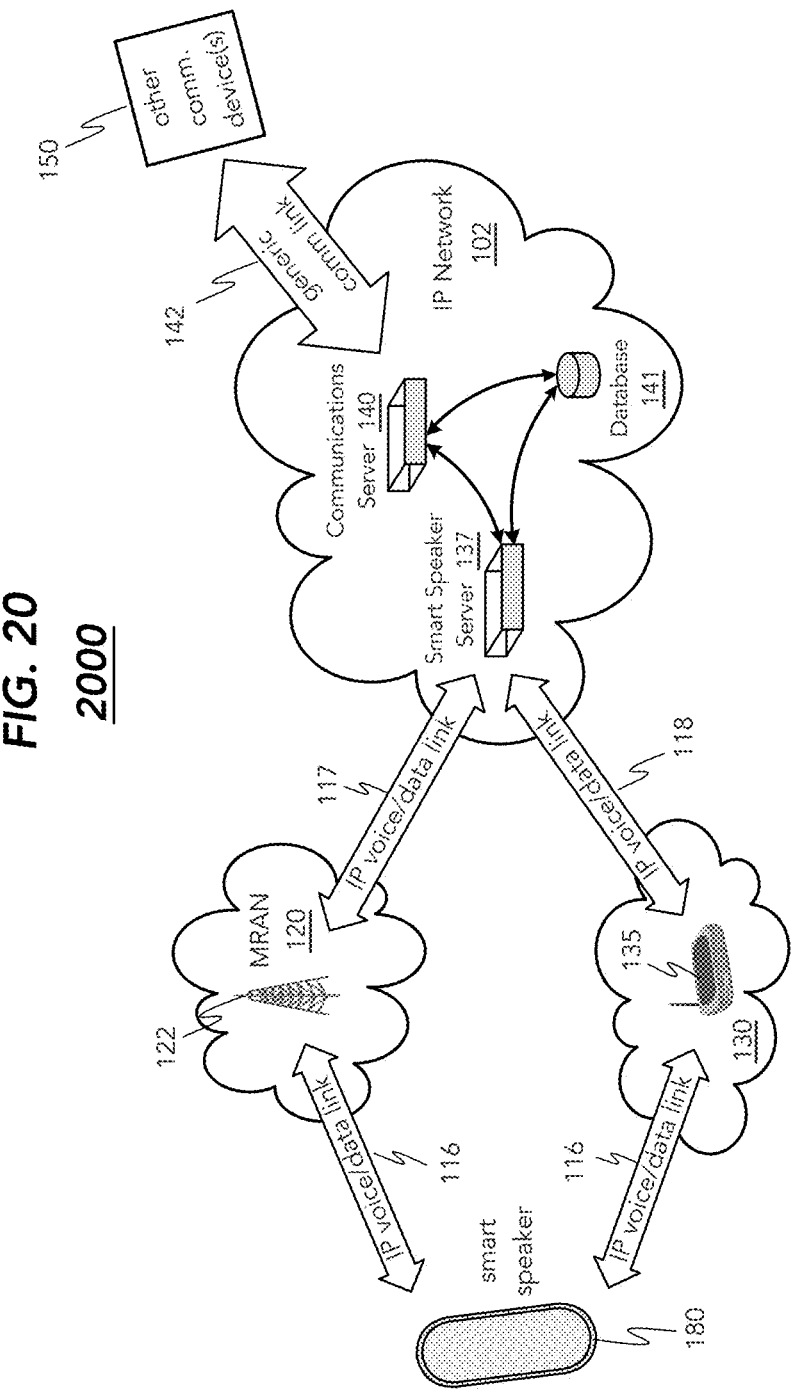
FIG. 20 illustrates another example block diagram for a networked environment.

FIG. 20 illustrates an exemplary networked environment 2000 for implementing certain exemplary embodiments described herein. The networked environment 2000 is similar to that of FIG. 16 but may further include an associated smart speaker server 137 that is also capable of VoIP communications and general IP data communications with communications server 140. The smart speaker server 137 may communicate with the smart speaker device 180 via radio tower 122 and MRAN 120 or IP access point 135 over IP access network 130.

FIG. 21 illustrates another example of a logic flow diagram 2100 according to an embodiment of the invention. In this embodiment, a smart speaker 180 may be used to place telephony calls using the account or credentials of a mobile phone device 110 or other valid telephone account. One or more outbound telephone numbers may be associated with the smart speaker device 180 via the smart speaker server 137. Each one of the outbound telephone numbers may be known to the communications server 140. This may involve the communications server 140 registering the smart speaker device 180 as a valid telephony endpoint for the one or more outbound telephone numbers. The registration process may be completed initially by the owner of the telephone number requesting the communications server accept communications signaling and media requests from the smart speaker server 137. The communications server 140 may require an initial registration and authentication process to link certain outbound telephone numbers with specific requests from the smart speaker server 137. The smart speaker server 137, in turn, may manage which particular smart speaker devices 180 may make such requests such as placing an outbound call using a particular outbound telephone number. The smart speaker device must be registered with the smart speaker server 137 as on-line in order to place an outbound telephone call. The communications server may then route calls back to the smart speaker device 180 through the smart speaker server 137. When a request to place an outbound call is made from the smart speaker device 180, the telephone number to be used for the outbound telephone call that is associated with the smart speaker device is forwarded to the communications server 140. Using this telephone number, the communications server 140 may identify the calling party for authentication, authorization, and billing purposes as well as caller ID purposes.

It should be noted that the smart speaker device 180 may be associated with multiple outbound telephone numbers. In such cases, the calling party may be required to include some identifying information pertaining to the identity of the calling party. Such identifying information may be known to the communications server 140 so as to allow the communications server 140 to properly associate the outbound telephone call with an outbound telephone number.

In this logic flow diagram 2100, the user may wish to place an outbound telephony call from the smart speaker device 180 using the mobile telephony device's 110 account information and credentials stored in the communications server 140 to place the call. The user may initiate an outbound telephone call via a verbal command to a smart speaker 180 at block 2105. The verbal command may include identifying information for the party to be called. For example, the user may wake the smart speaker 180 with a keyword followed by a command such as "Call Mom" or "Call 919-555-3856". In another embodiment, the command may include the source of the call as well such as "Greg, Call Mom". This would allow the smart speaker to be associated with more than one outbound telephone number as described above. In this manner, the smart speaker may be associated with multiple mobile telephone numbers and/or accounts.

The verbal command may be conveyed from the smart speaker 180 to a smart speaker server 137 via a network connection. The smart speaker server 137 may then parse the verbal command and convert it into an instruction to place a telephone call at block 2110. The computer instruction may also include the identifying information for the called party. For instance, the smart speaker server 137 may convert the speech of the received command to text and recognize the text as including the required elements of a specific command. In this example, the smart speaker server 137 may recognize the word "call" as the command to initiate an outbound call while recognizing the rest of the text "mom" as the person to be called or "919-555-3856" as the telephone number to be called, and, if included, "Greg" as the caller to be used for Caller ID purposes. Once the command has been parsed and recognized, the smart speaker server may forward the command to the communications server 140 for execution at block 2115. It should be noted that the smart speaker server and the communications server 140 may be separate servers or components within the same server architecture.

The command may further include an embedded code or identifier of the smart speaker 180 for authentication purposes. When the communications server 140 receives a call initiate request from the smart speaker server 137, it may authenticate the smart speaker 180 making the request to ensure there is at least one telephony account with at least one telephone number associated with the smart speaker 180 at block 2120. If there are multiple telephone numbers capable of outbound calling linked to that particular smart speaker 180, the communications server 140 will select a default telephone number from which to place the requested call. If the command/request includes an identifier for the calling party, the communications server 140 may override the default telephone number to that identified in the command/request.

The communications server 140 may then determine whether the parsed command/request identifies a name or a telephone number as the party to be called at decision block 2125. If the parsed command/request identifies a name for the party to be called, the name may be converted to a telephone number by looking up the name in a contacts database linked with the outbound telephone number at block 2130. Either way, once the communications server 140 has determined a destination telephone number to call, it dials the number and establishes a communication link with a telephony endpoint associated with the destination telephone number at block 2135. Simultaneously, the communications server 140 establishes a communication link with the smart speaker 180 and plays a ringing indicator at block 2140. Finally, the communications server 140 bridges the separate communications links between the smart speaker 180 and the communications server 140 and the destination telephony endpoint and the communications server 140 to create a communications session at block 2145. In this manner, a smart speaker 180 that has been associated and authenticated with a communications server 140 may initiate telephone calls using the credentials (e.g., account and telephone number) of an associated telephony account without needing physical access to an actual telephony endpoint (e.g., mobile phone, landline phone, VoIP phone, etc.).

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The invention claimed is:

1. A method of initiating a telephone call from a calling party to a called party, comprising:
   associating an outbound telephone number to a smart speaker device, the outbound telephone number known to a communications server;
   receiving, at the smart speaker device, a verbal command to initiate the telephone call, the verbal command including identifying information for the called party, wherein the verbal command to initiate the telephone call further includes a name of the calling party that is associated with a second outbound telephone number known to the communications server, the second outbound telephone number different from the smart speaker device outbound telephone number;
   associating the second outbound telephone number of the smart speaker device to the verbal command to initiate the telephone call;
   forwarding the verbal command to initiate the telephone call from the smart speaker device to a smart speaker server;
   converting the verbal command to a computer instruction to initiate the telephone call, the instruction including the identifying information for the called party;
   forwarding the computer instruction to initiate the telephone call from the smart speaker server to the communications server, the computer instruction including the second outbound telephone number;
   determining the telephone number of the called party based on the identifying information for the called party;
   establishing a first communication link between the communications server and a telephony endpoint of the called party;
   establishing a second communication link between the communications server and the smart speaker device; and
   bridging the first and second communication links into a communications session between the smart speaker device and the telephony endpoint of the called party.

2. The method of claim 1, wherein the smart speaker server and the communications server are the same server.

3. The method of claim 1, wherein the identifying information included in the verbal command to initiate the telephone call is a telephone number to be called.

4. The method of claim 1, wherein the identifying information included in the verbal command to initiate the telephone call is a name of the called party.

5. The method of claim 4, wherein the name of the called party is associated with a telephone number and stored in a contact database accessible to at least one of the smart speaker server and the communications server.

6. The method of claim 1, comprising:
   using the second outbound telephone number that is known to the communications server and associated with a telephony subscriber to identify the calling party when establishing the first communication link.

7. The method of claim 1, comprising:
   running the second communication link between the communications server and the smart speaker device through the smart speaker server.

8. A communications system comprising:
   one or more processors configured to execute instructions to initiate a telephone call from a calling party to a called party, the instructions to:
   associate an outbound telephone number to a smart speaker device, the outbound telephone number known to a communications server;
   receive, at the smart speaker device, a verbal command to initiate the telephone call, the verbal command including identifying information for the called party, wherein the verbal command to initiate the telephone call further includes a name of the calling party that is associated with a second outbound telephone number known to a communications server, the second outbound telephone number different from the smart speaker device outbound telephone number;
   associate the second outbound telephone number of the smart speaker device to the verbal command to initiate the telephone call;
   forward the verbal command to initiate the telephone call from the smart speaker device to a smart speaker server;
   convert the verbal command to a computer instruction to initiate the telephone call, the instruction including the identifying information for the called party;
   forward the computer instruction to initiate the telephone call from the smart speaker server to the communications server, the computer instruction including the second outbound telephone number;
   determine the telephone number of the called party based on the identifying information for the called party;
   establish a first communication link between the communications server and a telephony endpoint of the called party;
   establish a second communication link between the communications server and the smart speaker device; and
   bridge the first and second communication links into a communications session between the smart speaker device and the telephony endpoint of the called party.

9. The communications server of claim 8, wherein the smart speaker server and the communications server are the same server.

10. The communications server of claim 8, wherein the identifying information included in the verbal command to initiate the telephone call is a telephone number to be called.

11. The communications server of claim 8, wherein the identifying information included in the verbal command to initiate the telephone call is a name of the called party.

12. The communications server of claim 11, wherein the name of the called party is associated with a telephone number and stored in a contact database accessible to at least one of the smart speaker server and the communications server.

13. The communications server of claim 8, the one or more processors executing instructions to:
   use the second outbound telephone number that is known to the communications server and associated with a telephony subscriber to identify the calling party when establishing the first communication link.

14. The communications server of claim 8, the one or more processors executing instructions to:

run the second communication link between the communications server and the smart speaker device through the smart speaker server.

15. A non-transitory computer-readable medium comprising a plurality of instructions that when executed enable processing circuitry to execute instructions to initiate a telephone call from a calling party to a called party, the instructions to:
- associate an outbound telephone number to a smart speaker device, the outbound telephone number known to a communications server;
- receive, at the smart speaker device, a verbal command to initiate the telephone call, the verbal command including identifying information for the called party, wherein the verbal command to initiate the telephone call further includes a name of the calling party that is associated with a second outbound telephone number known to a communications server, the second outbound telephone number different from the smart speaker device outbound telephone number;
- associate the second outbound telephone number of the smart speaker device to the verbal command to initiate the telephone call;
- forward the verbal command to initiate the telephone call from the smart speaker device to a smart speaker server;
- convert the verbal command to a computer instruction to initiate the telephone call, the instruction including the identifying information for the called party;
- forward the computer instruction to initiate the telephone call from the smart speaker server to the communications server, the computer instruction including the second outbound telephone number;
- determine the telephone number of the called party based on the identifying information for the called party;
- establish a first communication link between the communications server and a telephony endpoint of the called party;
- establish a second communication link between the communications server and the smart speaker device; and
- bridge the first and second communication links into a communications session between the smart speaker device and the telephony endpoint of the called party.

16. The non-transitory computer-readable storage medium of claim 15, wherein the smart speaker server and the communications server are the same server.

17. The non-transitory computer-readable storage medium of claim 15, wherein the identifying information included in the verbal command to initiate the telephone call is a telephone number to be called.

18. The non-transitory computer-readable storage medium of claim 15, wherein the identifying information included in the verbal command to initiate the telephone call is a name of the called party.

19. The non-transitory computer-readable storage medium of claim 18, wherein the name of the called party is associated with a telephone number and stored in a contact database accessible to at least one of the smart speaker server and the communications server.

20. The non-transitory computer-readable storage medium of claim 15, the plurality of instructions that when executed enable the processing circuitry to:
- use the second outbound telephone number that is known to the communications server and associated with a telephony subscriber to identify the calling party when establishing the first communication link.

21. The non-transitory computer-readable storage medium of claim 15, the plurality of instructions that when executed enable the processing circuitry to:
- run the second communication link between the communications server and the smart speaker device through the smart speaker server.

* * * * *